United States Patent
Kahle et al.

(10) Patent No.: US 6,662,294 B1
(45) Date of Patent: Dec. 9, 2003

(54) CONVERTING SHORT BRANCHES TO PREDICATED INSTRUCTIONS

(75) Inventors: James Allan Kahle, Austin, TX (US); Charles Roberts Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 09/671,868

(22) Filed: Sep. 28, 2000

(51) Int. Cl.[7] .................................................. G06F 9/38
(52) U.S. Cl. ...................................... 712/226; 712/234
(58) Field of Search ................................. 912/226, 234

(56) References Cited

U.S. PATENT DOCUMENTS

| | | | |
|---|---|---|---|
| 6,052,776 A | | 4/2000 | Miki et al. |
| 6,427,234 B1 | * | 7/2002 | Chambers et al. ........... 717/140 |
| 6,446,258 B1 | * | 9/2002 | McKinsey et al. ........... 717/161 |

OTHER PUBLICATIONS

Mahlke et al., "Sentinel Scheduling for VLIW and Superscalar Processors", Proceedings of the 5th International Conference on Architectural Support for Programming Languages and Operating Systems, ACM, Oct. 1992, pp. 238–247.*

Gary S. Tyson, "The Effects of Predicated Execution on Branch Prediction", Proceedings of the 27th Annual Symposium on Branch Prediction, ACM, Nov. 1994, pp. 196–206.*

* cited by examiner

Primary Examiner—William M. Treat
(74) Attorney, Agent, or Firm—Joseph P. Lally; Diana L. Roberts; Volel Emile

(57) ABSTRACT

A microprocessor and method of processing instructions therein are disclosed. Initially, a sequence of instructions is dispatched by a dispatch unit of the microprocessor. A code sequence recognition unit (CSR) is configured to detect a short branch sequence within the sequence of instruction, where the short branch sequence includes a condition setting instruction, a conditional branch, and at least one additional instruction that is executed if the conditional branch is not taken. The short branch sequence is then internally converted to a predicated instruction sequence that includes the condition setting instruction and a predicated instruction corresponding to each additional instruction in the short branch sequence. The predicated instruction sequence is then executed in at least one functional unit of the processor. Detecting the short branch sequence may include calculating the relative branch address associated with the conditional branch instruction and comparing the relative branch address to a specified maximum. In one embodiment, the received sequence of instructions may be converted into an instruction group by the processor. In this embodiment, the specified maximum number of instructions in a short branch sequence may be a function of the number of instructions in an instruction group. In an embodiment where the conditional branch statement is preferably allocated to the last slot of the instruction group, the additional instructions in the short branch sequence are located in the next subsequent instruction group. Converting the short branch sequence to the predicated instruction sequence may include converting each additional instruction in the short branch sequence to an analogous predicated instruction. In one embodiment, converting each additional instruction to its analogous predicated instruction includes determining a predicated instruction opcode for each additional instruction in the short branch sequence by adjusting the opcode of each additional instruction by a predetermined offset. In another embodiment, the opcode conversion may be accomplished with an opcode lookup table.

24 Claims, 6 Drawing Sheets

EXAMPLE 1

EXAMPLE 2

EXAMPLE 3

CONVERTING SHORT BRANCHES TO PREDICATED INSTRUCTIONS

BACKGROUND

1. Field of the Present Invention

The present invention generally relates to the field of microprocessor architectures and more particularly to a microprocessor utilizing an instruction group architecture and logic for detecting code sequences within an instruction group that are suitable for conversion to one or more predicated instruction.

2. History of Related Art

As microprocessor technology has enabled gigahertz performance, a major challenge for microprocessor designers is to take advantage of state-of-the-art technologies while maintaining compatibility with the enormous base of installed software designed for operation with a particular instruction set architecture (ISA). To address this problem, designers have implemented "layered architecture" microprocessors that are adapted to receive instructions formatted according to an existing ISA and to convert the instruction format of the received instructions to an internal ISA that is more suitable for operation in gigahertz execution pipelines.

Because a layered architecture adds to the processor pipeline and increases that number of instructions that are potentially "in flight," at a given time, the branch mispredict penalty associated with a layered architecture is of great concern. One approach to minimizing branch misprediction penalties attempts simply to reduce the number of branch instructions. Since branch misprediction can only occur on a branch instruction, a code sequence containing no branch instructions can never be mispredicted. A well known method for reducing the number of branch instructions in a code sequence is includes the use of predicated instructions. Predicated instructions refer to instructions that perform a function, such as a fixed point add, if a condition that is specified in the predicated instruction itself, is satisfied. If the condition is not satisfied, instruction is treated as a NOP.

Predicated instructions can beneficially replace a code sequence that includes a condition setting instruction (such as a compare) followed by a conditional branch instruction and a short code sequence that is executed depending upon the status of the condition. In such a sequence, the conditional branch is used to branch around the relatively short code sequence depending upon the state of the condition. In the predicated instruction implementation of such a code sequence, the conditional branch statement is eliminated and each of the instructions in the short code sequence is replaced with a predicated instruction. As an example, the code sequence:

COMP R1, 0 //condition setting instruction
BEQ LBL //Branch to LBL1 if R1=0
  ADD R2, R3, R4
  ADD R2, R2, R5
LBL1, NOP could be replaced with predicated instructions as follows:

COMP R1, 0 //condition setting instruction
PADD R2, R3, R4, NE //predicate add executed only if condition (NE) is true
PADD R2, R2, R5, NE //predicate add executed only if condition (NE) is true Typically, predicated instructions are generated from high level source code by a compiler designed for use with an instruction set and hardware that support predicated instructions. The predicated instructions may have a distinct opcode from their non-predicated analogies. When compiling code for an instruction set that does not include predicated instructions, however, the compiler is forced to produce executable code that includes the conditional branch statement. It would be highly desirable to implement processor hardware capable of recognizing a code sequence characterized by a short branch and further capable of converting the sequence to a predicated code sequence during instruction decode or dispatch and executing the predicated code sequence. It would be further desirable if this predicated instruction conversion were transparent to system user such that recompiling of existing code would not be required to take advantage of the predicated execution hardware.

SUMMARY OF THE INVENTION

The goals described above are achieved with microprocessor and method of processing instructions therein as disclosed herein. Initially, a sequence of instructions is dispatched by a dispatch unit of the microprocessor. A code sequence recognition unit (CSR) is configured to detect a short branch sequence within the sequence of instruction, where the short branch sequence includes a condition setting instruction, a conditional branch, and at least one additional instruction that is executed if the conditional branch is not taken. The short branch sequence is then internally converted to a predicated instruction sequence that includes the condition setting instruction and a predicated instruction corresponding to each additional instruction in the short branch sequence. The predicated instruction sequence is then executed in at least one functional unit of the processor. Detecting the short branch sequence may include calculating the relative branch address associated with the conditional branch instruction and comparing the relative branch address to a specified maximum. In one embodiment, the received sequence of instructions may be converted into an instruction group by the processor. In this embodiment, the specified maximum number of instructions in a short branch sequence may be a function of the number of instructions in an instruction group. In an embodiment where the conditional branch statement is preferably allocated to the last slot of the instruction group, the additional instructions in the short branch sequence are located in the next subsequent instruction group. Converting the short branch sequence to the predicated instruction sequence may include converting each additional instruction in the short branch sequence to an analogous predicated instruction. In one embodiment, converting each additional instruction to its analogous predicated instruction includes determining a predicated instruction opcode for each additional instruction in the short branch sequence by adjusting the opcode of each additional instruction by a predetermined offset. In another embodiment, the opcode conversion may be accomplished with an opcode lookup table.

BRIEF DESCRIPTION OF THE DRAWINGS

Other objects and advantages of the invention will become apparent upon reading the following detailed description and upon reference to the accompanying drawings in which.

Figure 1:
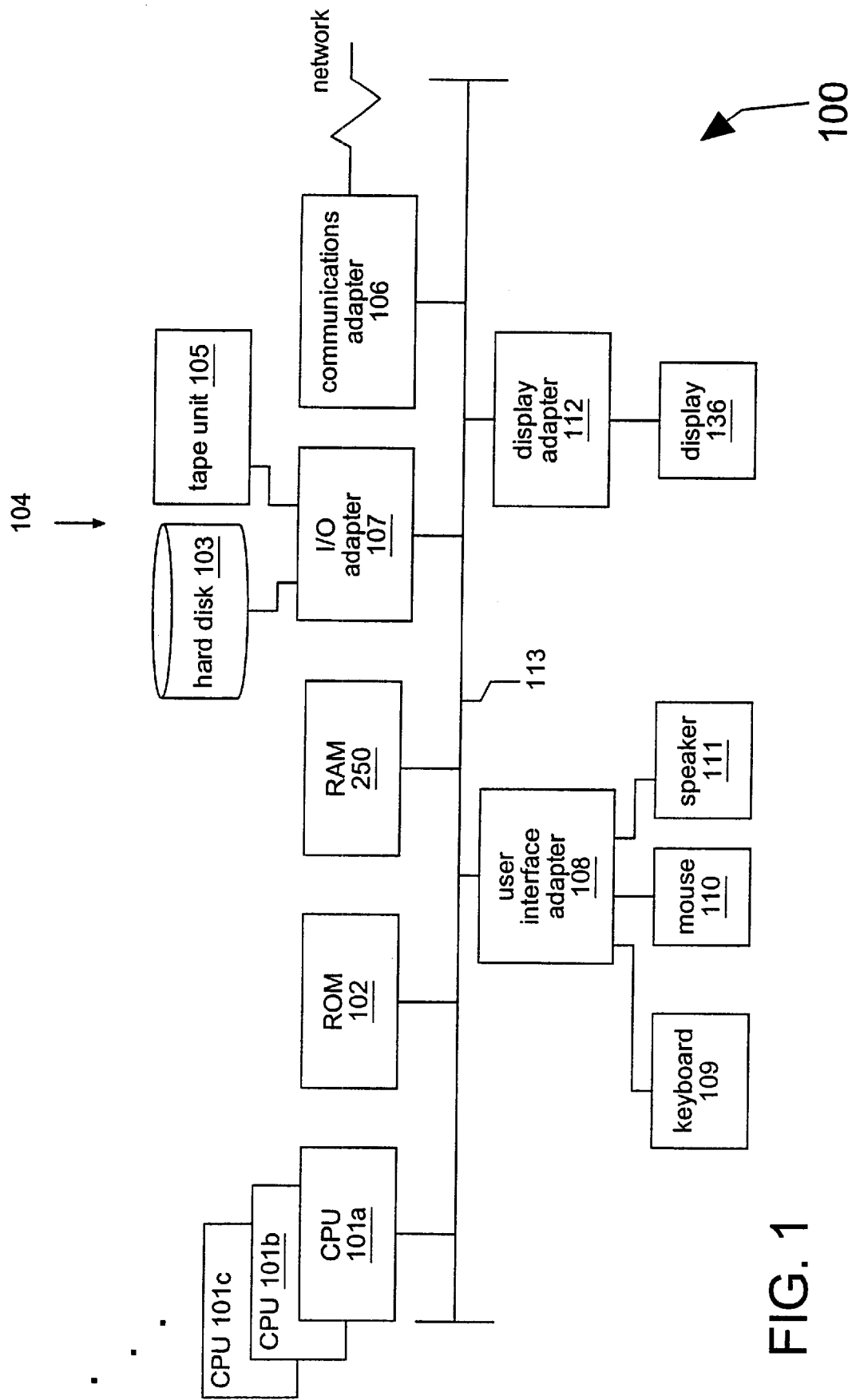
FIG. 1 is a block diagram of selected components of a data processing system including a microprocessor according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Referring now to FIG. 1, an embodiment of a data processing system 100 according to the present invention is depicted. System 100 includes one or more central processing units (processors) 101a, 101b, 101c, etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors*, (Morgan Kaufmann, 1994 2d edition). Processors 101 are coupled to system memory 250 and various other components via system bus 113. Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 links system bus 113 with mass storage devices 104 such as a hard disk 103 and/or a tape storage drive 105. Network adapter 106 interconnects bus 113 with an external network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include the Peripheral Components Interface (PCI) bus as specified according to PCI Local Bus Specification Rev. 2.2 available from the PCI Special Interest Group, Hillsboro, Oreg., and incorporated by reference herein. Additional input/output devices are shown as connected to system bus 113 via user interface adapter 108. A keyboard 109, mouse 110, and speaker 111 are all linked to bus 113 via user interface adapter 108, which may include, for example, a SuperI/O chip integrating multiple device adapters into a single integrated circuit. For additional information concerning one such chip, the reader is referred to the *PC87338/PC97338ACPI* 1.0 and *PC98/99 Compliant SuperI/O* data sheet from National Semiconductor Corporation (November 1998) at www.national.com. Thus, as configured in FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system such as the AIX® operating system from IBM Corporation or other suitable operating system to coordinate the functions of the various components shown in FIG. 1. Additional detail concerning the AIX operating system is available in *AIX Version 4.3 Technical Reference: Base Operating System and Extensions, Volumes* 1 and 2 (order numbers SC23-4159 and SC23-4160); *AIX Version 4.3 System User's Guide: Communications and Networks* (order number SC23-4122); and *AIX Version 4.3 System User's Guide: Operating System and Devices* (order number SC23-4121) from IBM Corporation at www.ibm.com and incorporated by reference herein.

Figure 2:
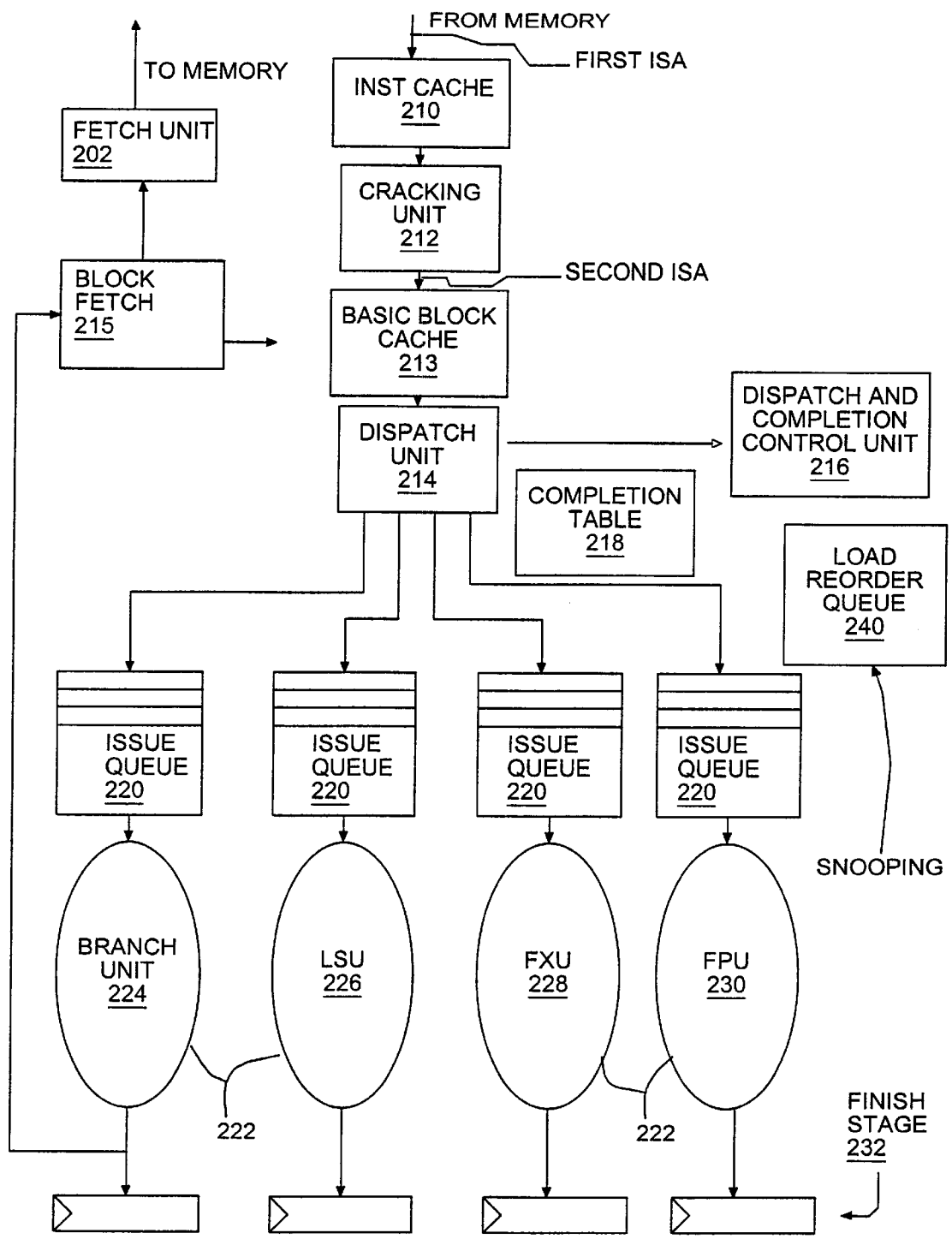
FIG. 2 is a block diagram of selected components of a microprocessor according to one embodiment of the present invention.

Turning now to FIG. 2, a simplified block diagram of a processor 101 according to one embodiment of the present invention is illustrated. Processor 101 as depicted in FIG. 2 includes an instruction fetch unit 202 suitable for generating an address of the next instruction to be fetched. The instruction address generated by fetch unit 202 provided to an instruction cache 210. Fetch unit 202 may include branch prediction logic that, as its name suggests, is adapted to make an informed prediction of the outcome of a decision that effects the program execution flow. The ability to correctly predict branch decisions is a significant factor in the overall ability of processor 101 to achieve improved performance by executing instructions speculatively and out-of-order. The instruction address generated by fetch unit 202 is provided to an instruction cache 210, which contains a subset of the contents of system memory in a high speed storage facility. The instructions stored in instruction cache 210 are preferably formatted according to a first ISA, which is typically a legacy ISA such as, for example, the PowerPC or an x86 compatible instruction set. Detailed information regarding the PowerPC® instruction set is available in the PowerPC 620 RISC *Microprocessor User's Manual* available from Motorola, Inc. (Order No. MPC620UM/AD), which is incorporated by reference herein. If the address instruction generated by fetch unit 202 corresponds to a system memory location that is currently replicated in instruction cache 210, instruction cache 210 forwards the corresponding instruction to cracking unit 212. If the instruction corresponding to the instruction address generated by fetch unit 202 does not currently reside in instruction cache 210 (i.e., the instruction address provided by fetch unit 202 misses in instruction cache 210), the instructions must be fetched from an L2 cache (not shown) or system memory before the instruction can be forwarded to cracking unit 212.

Cracking unit 212 is adapted to modify an incoming instruction stream to produce a set of instructions optimized for executing in an underlying execution pipeline at high operating frequencies (i.e., operating frequencies exceeding 1 GHz). In one embodiment, for example, cracking unit 212 receives instructions in a 32-bit wide ISA such as the instruction set supported by the PowerPC® microprocessor and converts the instructions to a second, preferably wider, ISA that facilitates execution in a high speed execution unit operating in the gigahertz frequency range and beyond. The wider format of the instructions generated by cracking unit 212 may include, as an example, explicit fields that contain information (such as operand values) that is merely implied or referenced in the instructions received by cracking unit 212, which are formatted according to a first format. In one embodiment, for example, the ISA of instructions generated by cracking unit 212 is 64 or more bits wide.

Figure 3:
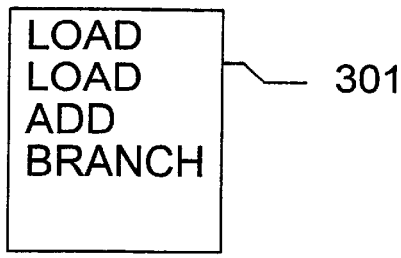
FIG. 3 illustrates examples of the instruction cracking function performed by one embodiment of the processor of FIG. 2.
Figure 3:
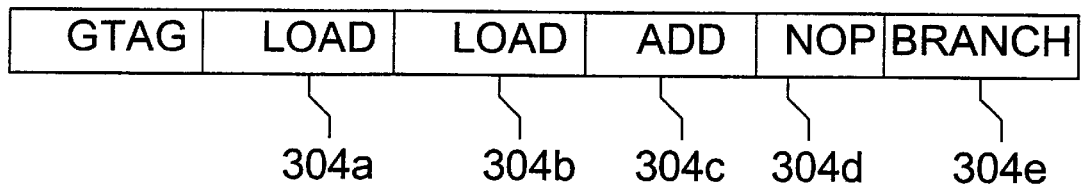
Figure 3:
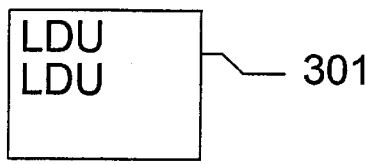
Figure 3:
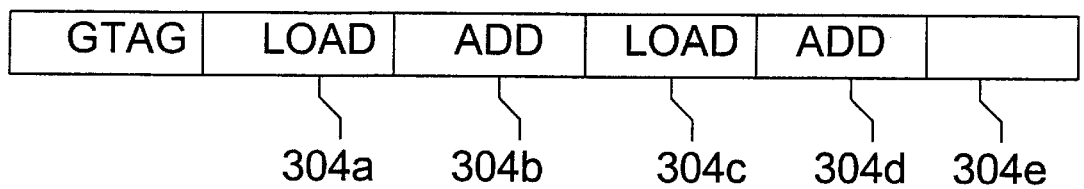
Figure 3:
Figure 3:
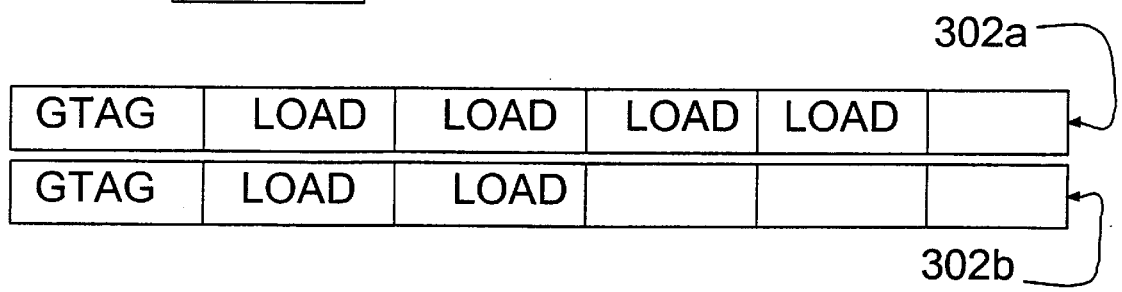

In one embodiment, cracking unit 212 as contemplated herein, in addition to converting instructions from a first format to a second, and preferably wider, format, is designed to organize a set of fetched instructions into instruction "groups" 302, examples of which are depicted in FIG. 3. Each instruction group 302 includes a set of instruction slots 304a, 304b, etc. (collectively or generically referred to as instruction slots 304). The organization of a set of instructions into instruction groups facilitates high speed execution by, among other things, simplifying the logic needed to maintain rename register mapping and completion tables for a large number of in-flight instructions.

In FIG. 3, three examples of instruction grouping that may be performed by cracking unit 212 are depicted. In Example 1, a set of instructions indicated by reference numeral 301 is transformed into a single instruction group 302 by cracking unit 212. In the depicted embodiment of the invention, each instruction group 302 includes five slots indicated by reference numerals 304a, 304b, 304c, 304d, and 304e. Each slot 304 may contain a single instruction. In this embodiment, each instruction group may include a maximum of five instructions. In one embodiment, the instructions in the set of instructions 301 received by cracking unit 212 are formatted according to a first ISA, as discussed previously, and the instructions stored in the groups 302 are formatted according to a second wider format. The use of instruction groups simplifies renaming recovery and completion table logic by reducing the number of instructions that must be individually tagged and tracked. The use of instruction groups thus contemplates sacrificing some information about each instruction in an effort to simplify the process of tracking pending instructions in an out-of-order processor.

Example 2 of FIG. 3 illustrates a second example of the instruction grouping performed by cracking unit 212 according to one embodiment of the invention. This example demonstrates the capability of cracking unit 212 to break down complex instructions into a group of simple instructions for higher speed execution. In the depicted example, a sequence of two load-with-update (LDU) instructions are broken down into an instruction group including a pair of load instructions in slots 304a and 304c respectively and a pair of ADD instructions in slots 304b and 304d respectively. In this example, because group 302 does not contain a branch instruction, the last slot 304e of instruction group 302 contains no instruction. The PowerPC® load-with-update instruction, like analogous instructions in other instruction sets, is a complex instruction in that the instruction affects the contents of multiple general purpose registers (GPRs). Specifically, the load-with-update instruction can be broken down into a load instruction that affects the contents of a first GPR and an ADD instruction that affects the contents of a second GPR. Thus, in instruction group 302 of Example 2 in FIG. 3, instructions in two or more instruction slots 304 correspond to a single instruction received by cracking unit 212.

In Example 3, a single instruction entering cracking unit 212 is broken down into a set of instructions occupying multiple groups 302. More specifically, Example 3 illustrates a load multiple (LM) instruction. The load multiple instruction (according to the PowerPC® instruction set) loads the contents of consecutive locations in memory into consecutively numbered GPRs. In the depicted example, a load multiple of six consecutive memory locations breaks down into six load instructions. Because each group 302 according to the depicted embodiment of processor 101 includes, at most, five instructions, and because the fifth slot 304e is reserved for branch instructions, a load multiple of six registers breaks down into two groups 302a and 302b respectively. Four of the load instructions are stored in the first group 302a while the remaining two load instructions are stored in the second group 302b. Thus, in Example 3, a single instruction is broken down into a set of instructions that span multiple instruction groups 302.

Figure 5:
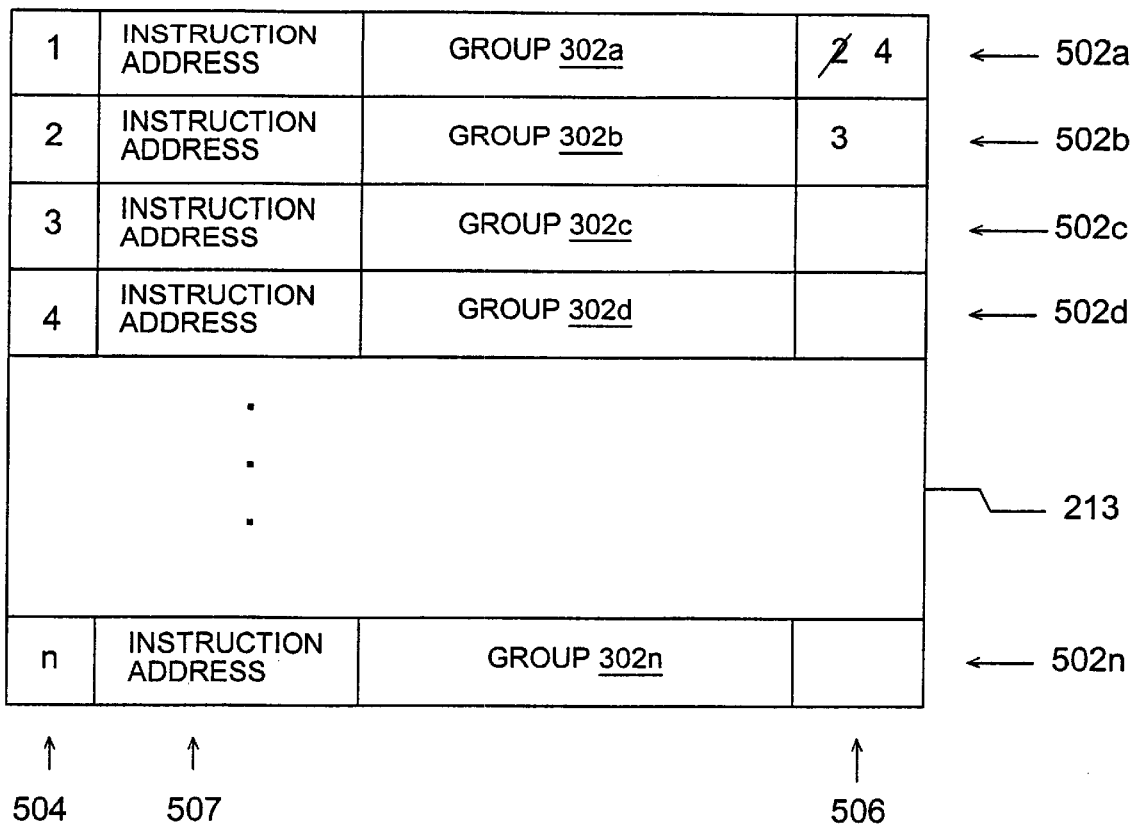
FIG. 5 is block diagram of a basic cache block of the microprocessor of FIG. 2.

Returning now to FIG. 2, the instruction groups 302 generated by the preferred embodiment of cracking unit 212 are forwarded to a basic block cache 213 where they are stored pending execution. Referring to FIG. 5, an embodiment of basic block cache 213 is depicted. In the depicted embodiment, basic block cache 213 includes a set of entries 502a through 502n (generically or collectively referred to as basic block cache entries 502). In one embodiment, each entry 502 in basic block cache 213 contains a single instruction group 302. In addition, each entry 502 may include an entry identifier 504, a pointer 506, and an instruction address (IA) field 507. The instruction address field 507 for each entry 502 is analogous to the IA field 704 of completion table 218. In one embodiment, each entry 502 in basic block cache 504 corresponds to an entry in completion table 218 and the instruction address field 507 indicates the instruction address of the first instruction in the corresponding instruction group 302. In one embodiment, the pointer 506 indicates the entry identifier of the next instruction group 302 to be executed based upon a branch prediction algorithm, branch history table, or other suitable branch prediction mechanism.

Figure 6:
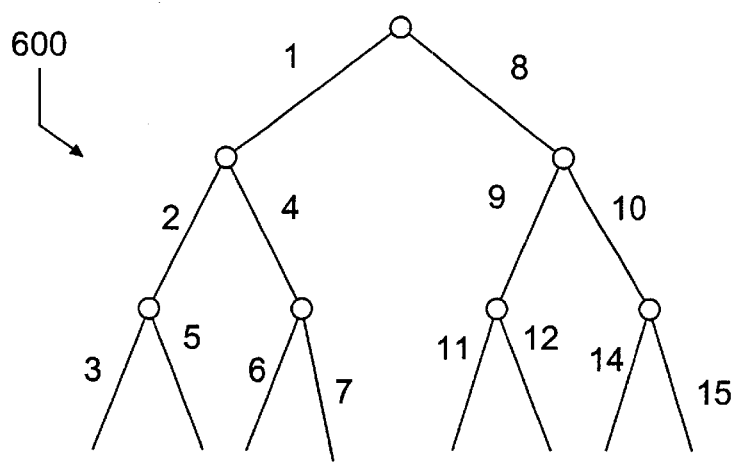
FIG. 6 is an illustration of various branching scenarios that the processor of FIG. 2 may encounter.

As indicated previously, the preferred implementation of forming instruction groups 302 with cracking unit 212 allocates branch instructions to the last slot 304 in each group 302. In addition, the preferred embodiment of cracking unit 212 produces instruction groups 302 in which the number of branch instructions in a group 302 to one (or less). In this arrangement, each instruction group 302 can be thought of as representing a "leg" of a branch tree 600 as indicated in FIG. 6, in which instruction groups 302 are represented by their corresponding instruction group entry 504 values. First instruction group 302a, for example, is indicated by its entry number (1), and so forth. Suppose, as an example, that the branch prediction mechanism of processor 101 predicts that leg 2 (corresponding to second group 302b) will be executed following leg 1 and that leg 3 will be executed following leg 2. The basic block cache 213, according to one embodiment of the invention, reflects these branch predictions by setting the pointer 506 to indicate the next group 302 to be executed. The pointer 506 of each entry 502 in basic block cache 213 may be utilized to determine the next instruction group 302 to be dispatched.

Basic block cache 213 works in conjunction with a block fetch unit 215 analogous to the manner in which fetch unit 202 works with instruction cache 210. More specifically, block fetch unit 215 is responsible for generating an instruction address that is provided to basic block cache 213. The instruction address provided by block fetch unit 215 is compared against addresses in the instruction address fields 507 in basic block cache 213. If the instruction address provided by block fetch unit 213 hits in basic block cache 213, the appropriate instruction group is forwarded to issue queues 220. If the address provided by block fetch unit 215 misses in basic block cache 213, the instruction address is fed back to fetch unit 202 to retrieve the appropriate instructions from instruction cache 210. In one embodiment suitable for its conservation of area (die size), basic block cache 213 enables the elimination of instruction cache 210. In this embodiment, instructions are retrieved from a suitable storage facility such as an L2 cache or system memory and provided directly to cracking unit 212. If an instruction address generated by block fetch unit 213 misses in basic block cache 213, the appropriate instructions are retrieved from an L2 cache or system memory rather than from instruction cache 210.

The depicted embodiment of processor 101 further indicates a dispatch unit 214. Dispatch unit 214 is responsible for ensuring that all necessary resources are available prior to forwarding the instructions in each instruction group to their appropriate issue queues 220. In addition, dispatch unit 214 communicates with dispatch and completion control logic 216 to keep track of the order in which instructions were issued and the completion status of these instructions to facilitate out-of-order execution. In the embodiment of processor 101 in which cracking unit 212 organizes incoming instructions into instruction groups as discussed above, each instruction group 302 is assigned a group tag (GTAG) by completion and control logic 216 that conveys the ordering of the issued instruction groups. As an example, dispatch unit 214 may assign monotonically increasing values to consecutive instruction groups. With this arrangement, instruction groups with lower GTAG values are known to have issued prior to (i.e., are younger than) instruction groups with larger GTAG values. Although the depicted embodiment of processor 101 indicates dispatch unit 214 as a distinct functional block, the group instruction organization of basic block cache 213 lends itself to incorporating the functionality of dispatch unit 214. Thus, in one embodiment, dispatch unit 214 is incorporated within basic block cache 213, which is connected directly to issue queues 220.

Figure 7:
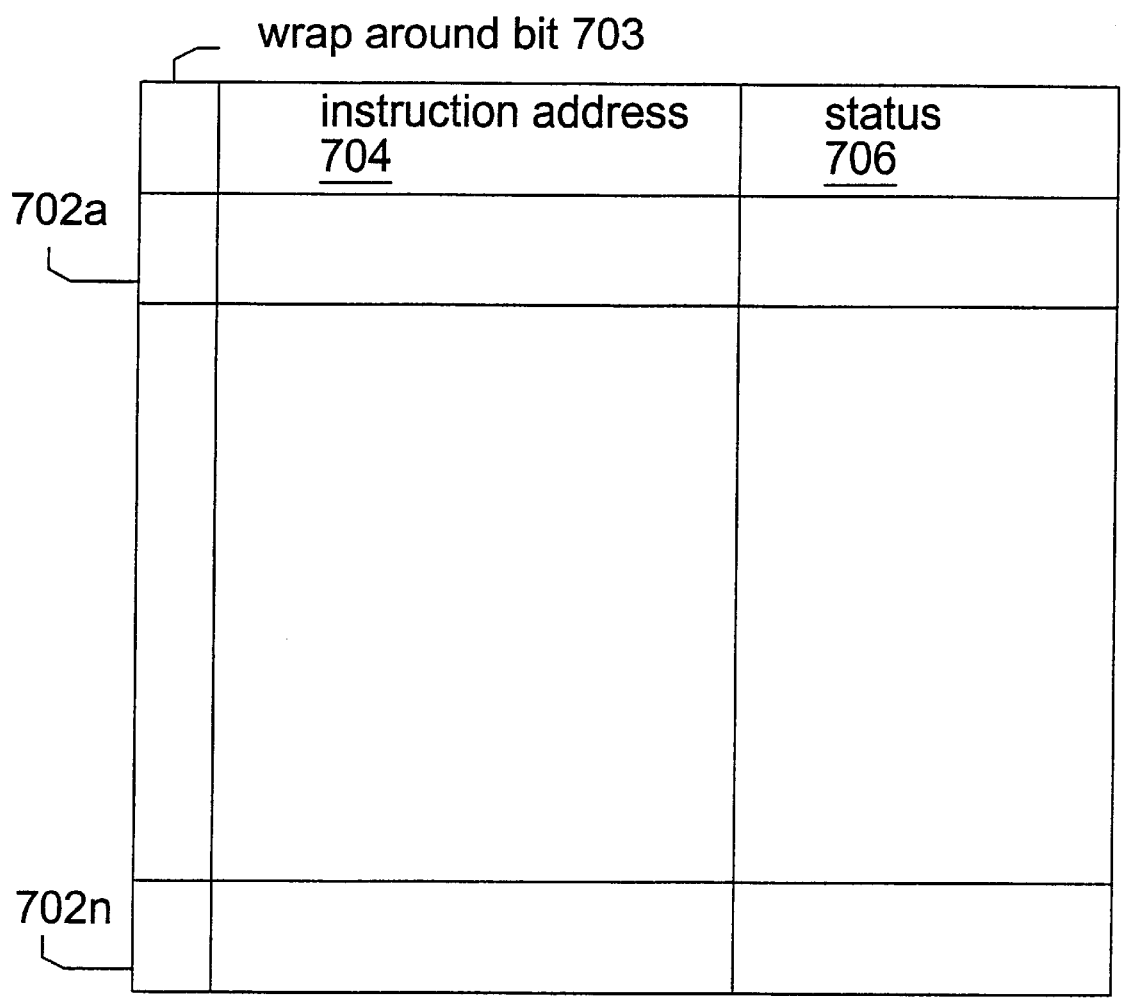
FIG. 7 is a block diagram of a completion table suitable for use with the present invention.

In association with dispatch and completion control logic 216, a completion table 218 is utilized in one embodiment of the present invention to track the status of issued instruction groups. Turning to FIG. 7, a block diagram of one embodiment of completion table 218 is 20 presented. In the depicted embodiment, completion table 218 includes a set of entries 702a through 702n (collectively or generically referred to herein as completion table entries 702). In this embodiment, each entry 702 in completion table 218 includes an instruction address (IA) field 704 and a status bit field 706. In this embodiment, the GTAG value of each instruction group 302 identifies the entry 702 in completion table 218 in which completion information corresponding to the instruction group 302 is stored. Thus, the instruction group 302 stored in entry 1 of completion table 118 will have a GTAG value of 1, and so forth. In this embodiment, completion table 118 may further include a "wrap around" bit to indicate that an instruction group with a lower GTAG value is actually younger than an instruction group with a higher GTAG value. In one embodiment, the instruction address field 704 includes the address of the instruction in first slot 304a of the corresponding instruction group 302. Status field 706 may contain one or more status bits indicative of whether, for example, the corresponding entry 702 in completion table 218 is available or if the entry has been allocated to a pending instruction group.

In the embodiment of processor 101 depicted in FIG. 2, instructions are issued from dispatch unit 214 to issue queues 220 where they await execution in corresponding execution pipes 222. Processor 101 may include a variety of types of executions pipes, each designed to execute a subset of the processor's instruction set. In one embodiment, execution pipes 222 may include a branch unit pipeline 224, a load store pipeline 226, a fixed point arithmetic unit 228, and a floating point unit 230. Each execution pipe 222 may comprise two or more pipeline stages. Instructions stored in issue queues 220 may be issued to execution pipes 222 using any of a variety of issue priority algorithms. In one embodiment, for example, the oldest pending instruction in an issue queue 220 is the next instruction issued to execution pipes 222. In this embodiment, the GTAG values assigned by dispatch unit 214 are utilized to determine the relative age of instructions pending in the issue queues 220. Prior to issue, the destination register operand of the instruction is assigned to an available rename GPR. When an instruction is ultimately forwarded from issue queues 120 to the appropriate execution pipe, the execution pipe performs the appropriate operation as indicated by the instruction's opcode and writes the instruction's result to the instruction's rename GPR by the time the instruction reaches a finish stage (indicated by reference numeral 132) of the pipeline. A mapping is maintained between the rename GPRs and their corresponding architected registers. When all instructions in an instruction group (and all instructions in younger instruction groups) finish without generating an exception, a completion pointer in the completion table 218 is incremented to the next instruction group. When the completion pointer is incremented to a new instruction group, the rename registers associated with the instructions in the old instruction group are released thereby committing the results of the instructions in the old instruction group. If one or more instructions older than a finished (but not yet committed) instruction generates an exception, the instruction generating the exception and all younger instructions are flushed and a rename recovery routine is invoked to return the GPR mapping to the last known valid state.

If a predicted branch is not taken (branch misprediction), the instructions pending in executions pipes 222 and issue queues 220 are flushed. In addition, the pointer 506 of the basic block cache entry 502 associated with the mispredicted branch is updated to reflect the most recent branch taken. An example of this updating process is illustrated in FIG. 5 for the case in which program execution results in a branch from leg 1 (instruction group 302a) to leg 4 (instruction group 302d). Because the pointer 506 of entry 502a had previously predicted a branch to the instruction group residing in the number 2 entry of basic block cache 213 (i.e., group 302b), the actual branch from instruction group 302a to group 302d was mispredicted. The mispredicted branch is detected and fed back to block fetch unit 215, the instructions pending between basic block cache 213 and the finish stage 232 of each of the pipelines 222 are flushed, and execution is re-started with instruction group 302d in entry 4 of basic block cache 213. In addition, the pointer 506 of basic block cache entry 502a is altered from its previous value of 2 to its new value of 4 reflecting the most recent branch information. By incorporating basic block cache 213 and block fetch unit 215 in close proximity to the execution pipelines 222, the present invention contemplates a reduced performance penalty for a mispredicted branch. More specifically, by implementing basic block cache 213 on the "downstream" side of instruction cracking unit 212, the present invention eliminates instructions that are pending in cracking unit 212 from the branch misprediction flush path thereby reducing the number of pipeline stages that must be purged following a branch mispredict and an reducing the performance penalty. In addition, the basic block cache 213 contemplates a caching mechanism with a structure that matches the organization of dispatch and completion control unit 216 and completion table 218 thereby simplifying the organization of the intervening logic and facilitating the implementation of useful extensions to the basic block cache 213 as described below.

The performance penalty caused by branch misprediction is minimized in processor 101 according to the present invention by the inclusion of a code sequence recognition unit (CSR). The CSR is preferably configured to detect code sequences that include a short branch sequence. A short branch sequence is characterized by a condition setting instruction followed by a conditional branch instruction and a short sequence of "substantive" instructions. The condition setting instruction is typically an instruction, such as a compare instruction, that alters the contents of the condition register in the PowerPC® architecture or an analogous register in another architecture. The substantive instructions are typically instructions, such as add instructions, that affect the contents of one or more general purpose or floating point registers. If the CSR detects the presence of a short branch sequence, it generates a functionally equivalent predicated code sequence by eliminating the branch instruction from the sequence and replacing each of the substantive instructions with an analogous predicated instruction.

Figure 4:
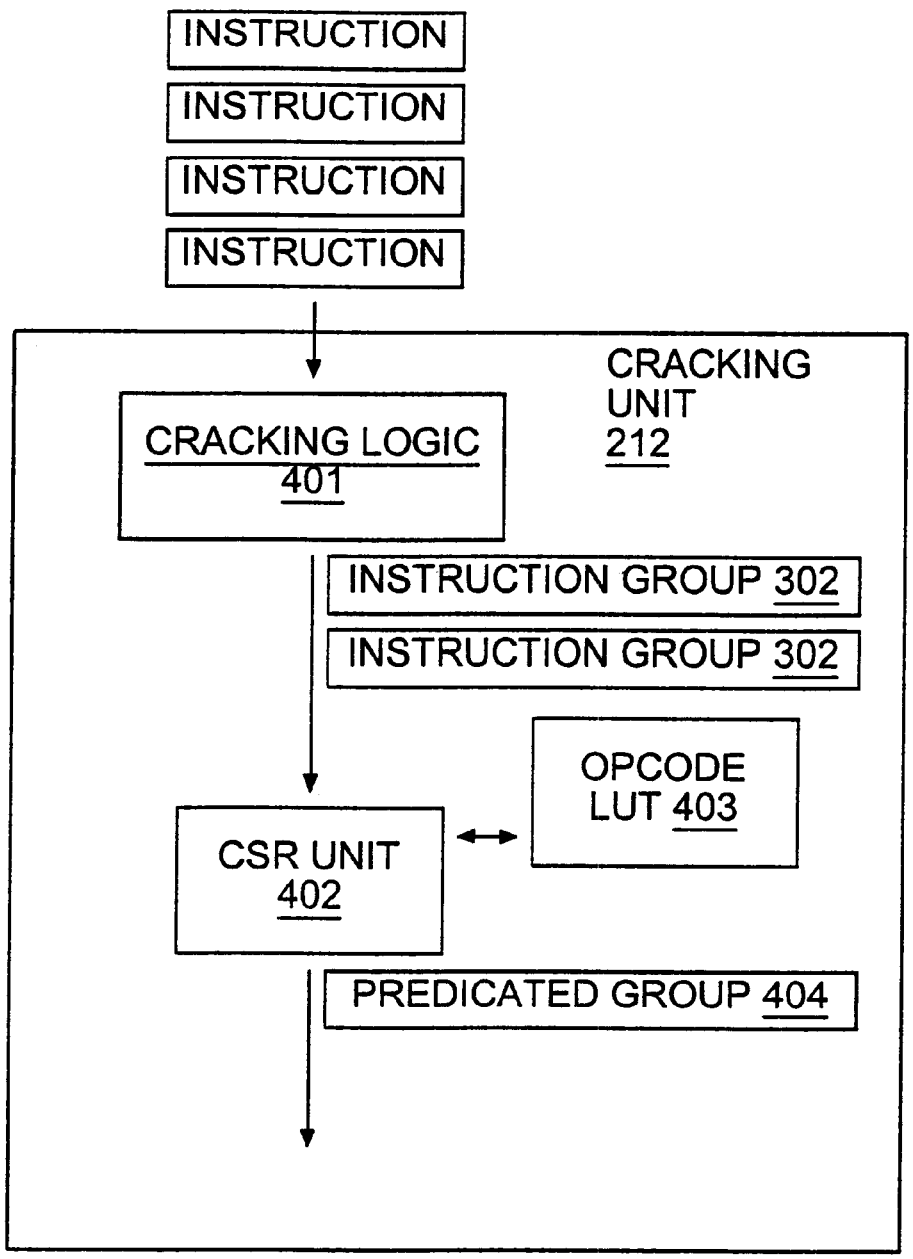
FIG. 4 is a block diagram illustrating selected portions of a microprocessor according to one embodiment of the invention.

In an embodiment of processor 101 that includes a cracking unit 212 as described previously, the CSR, as indicated in FIG. 4 by reference numeral 402, may be embedded in cracking unit 212. In this embodiment, CSR 402 is configured to detect the presence of a conditional branch instruction in an instruction group 302. If a conditional branch is detected, the branch address of the conditional branch instruction is compared to the instruction address of the conditional branch instruction to determine if the sequence constitutes a short branch sequence. A short branch sequence might be delineated as a branch sequence that includes no more substantive instructions than the number of instructions an instruction group 302 may contain. If, for example, instruction groups 302 produced by cracking unit 212 may include four substantive instructions, the upper limit on the number of substantive instructions in a short branch sequence may be limited to four.

In an architecture that employs fixed length instructions, the number of instructions that a conditional branch instruction jumps around (when taken) may be calculated by dividing the offset between the instruction addresses of the conditional branch instruction and the branch target by the number of bytes per instruction. If the number of instructions within the branch loop does not exceed the maximum number of instructions permitted for a short branch sequence, CSR 402 converts the code sequence to a functionally equivalent predicated code sequence 404 by deleting the conditional branch instruction and converting each substantive instruction to its predicated equivalent.

In one embodiment, the code sequence conversion process is simplified by implementing predicated instructions with an opcode that is a function of its non-predicated equivalent. Each predicated instruction, for example, may be assigned an opcode that is a fixed offset from its corresponding non-predicated opcode. In another embodiment suitable for architectures in which it is not feasible to implement predicated instruction opcodes as a function of non-predicated opcodes, CSR 402 may utilized an opcode lookup table 403 that specifies the predicated opcode equivalent of each substantive instruction. During conversion, CSR 402 retrieves the appropriate predicated instruction opcode for each non-predicated substantive instruction in the original code sequence. The operands of the predicated instruction remain the same as the non-predicated instruction. The condition code execution of the predicated instruction is based is determined from the conditional branch instruction of the original code sequence and included in each predicated instruction.

In an embodiment in which cracking unit 212 groups instructions as discussed previously with branch instructions preferably allocated to the last slot in an instruction group 302, CSR 402 may be configured to evaluate the contents of consecutive instruction groups in forming a predicated instruction sequence. In this embodiment, a code sequence is detected by examining the last slot in each instruction group 302. If the last slot contains a conditional branch instruction, CSR 402 determines if the branch target constitutes a short branch as discussed previously. If the maximum length of a short branch is defined as the maximum number of substantive instructions contained in an instruction group 302, CSR 402 needs only to convert the substantive instructions in the instruction group 302 immediately following the group 302 that contained the conditional branch. To support predicated execution as contemplated herein, each of the execution units including FXU 228, FPU 230, LSU 226 is configured to execute predicated instructions. In one embodiment, the predicated circuit might include a preliminary execution pipeline stage in which the predicate condition is evaluated. If the predicate condition is true, the execution unit executes the instruction in the conventional manner. If the predicate condition is false, the instruction must be retired from the execution pipeline in a manner that a) leaves the target register in the same state as it was prior to executing the instruction and b) informs other instructions that are dependent on the result of the predicated instruction that they can proceed. These objectives could be met by discarding the result of the predicated instruction and broadcasting to all dependent instructions that the result of the predicated instruction is committed. In another embodiment, the predicated instruction could issue as two instructions only one of whose result is committed. One of the instructions would perform the same calculation (or other function) as the predicated instruction and the other instruction would perform no function. The instruction that is committed depends upon the predicate condition. In still another embodiment, the predicate instruction, upon determining that the predicate condition is false, could perform a read of the target register followed by an immediate write back to simulate a NOP while simultaneously exercising the renaming logic.

It will be apparent to those skilled in the art having the benefit of this disclosure that the present invention contemplates improved performance by enabling hardware conversion of short branch code sequences to predicated execution code sequences and enabling the execution of the converted sequences. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of processing instructions in a microprocessor, comprising:
   receiving a sequence of instructions;
   detecting a short branch sequence within the sequence of instructions, wherein the short branch sequence includes a condition setting instruction, a conditional branch, and at least one additional instruction, wherein the additional instruction is conditionally executed if the conditional branch is not taken;

internally converting the short branch sequence to a predicated instruction sequence including the condition setting instruction and a predicated instruction corresponding to each additional instruction in the short branch sequence; and executing the predicated instruction sequence in at least one functional unit of the processor.

2. The method of claim 1 wherein detecting the short branch sequence includes calculating the relative branch address associated with the conditional branch instruction.

3. The method of claim 2, further comprising comparing the relative branch address to a specified maximum.

4. The method of claim 3, further comprising, organizing the received sequence of instructions into an instruction group, and wherein the specified maximum relative branch address is a function of the number of instructions in an instruction group.

5. The method of claim 1, further comprising, forming an instruction group from sequence of instructions, wherein detecting the short branch sequence comprises detecting a conditional branch instruction in the instruction group.

6. The method of claim 5, wherein the conditional branch statement is located in a last slot of the instruction group.

7. The method of claim 6, wherein each additional instruction in the short branch sequence is located in the instruction group following the instruction group containing the conditional branch statement.

8. The method of claim 1, wherein converting the short branch sequence to the predicated instruction sequence includes converting each additional instruction in the short branch sequence to an analogous predicated instruction.

9. The method of claim 8, wherein converting each additional instruction to its analogous predicated instruction includes determining a predicated instruction opcode for each additional instruction in the short branch sequence.

10. The method of claim 9, wherein determining the predicated instruction opcode includes adjusting the opcode of each additional instruction by a predetermined offset.

11. The method of claim 9, wherein determining the predicated instruction opcode includes retrieving a predicated instruction opcode from an opcode lookup table.

12. The method of claim 1, wherein each predicated instruction includes a substantive instruction and a condition that is set by the condition setting instruction, and wherein the substantive instruction is executed if the condition is true.

13. A microprocessor including:
a dispatch unit suitable for dispatching a sequence of instructions;
a code sequence recognition unit (CSR) enabled to detect a short branch sequence in the sequence of instructions, wherein the short branch sequence includes a condition setting instruction, a conditional branch, and at least one additional instruction, and further enabled to convert the short branch sequence to a functionally equivalent predicated instruction sequence; and
at least one execution unit enabled to execute the predicated instruction sequence.

14. The microprocessor of claim 13 wherein the CSR is enabled to calculate the relative branch address associated with the conditional branch instruction and to compare the relative branch address to a specified maximum.

15. The microprocessor of claim 14, wherein the microprocessor is enabled to organize the received sequence of instructions into an instruction group, and wherein the specified maximum relative branch address is a function of the number of instructions in an instruction group.

16. The microprocessor of claim 13, wherein the CSR is configured to convert each of the at least one additional instruction in the short branch sequence to an analogous predicated instruction.

17. The microprocessor of claim 16, wherein the CSR is enabled to convert each of the at least one additional instruction to its analogous predicated instruction by determining a predicated instruction opcode for each additional instruction in the short branch sequence.

18. The microprocessor of claim 17, wherein the CSR determines the predicated instruction opcode includes adjusting the opcode of each additional instruction by a predetermined offset.

19. The microprocessor of claim 17, wherein determining the predicated instruction opcode includes retrieving a predicated instruction opcode from an opcode lookup table.

20. A data processing system including processor, memory, input means, and display, wherein the processor comprises:
a dispatch unit suitable for dispatching a sequence of instructions;
a code sequence recognition unit (CSR) enabled to detect a short branch sequence in the sequence of instructions, wherein the short branch sequence includes a condition setting instruction, a conditional branch, and at least one additional instruction, and further enabled to convert the short branch sequence to a functionally equivalent predicated instruction sequence; and
at least one execution unit enabled to execute the predicated instruction sequence.

21. The data processing system of claim 20, wherein the CSR is enabled to calculate the relative branch address associated with the conditional branch instruction and to compare the relative branch address to a specified maximum.

22. The data processing system of claim 20, wherein the CSR is enabled to convert each of the at least one additional instructions to its analogous predicated instruction by determining a predicated instruction opcode for each additional instruction in the short branch sequence.

23. The data processing system of claim 22, wherein the CSR determines the predicated instruction opcode includes adjusting the opcode of each additional instruction by a predetermined offset.

24. The microprocessor of claim 22, wherein determining the predicated instruction opcode includes retrieving a predicated instruction opcode from an opcode lookup table.

* * * * *